(12) United States Patent
Eskolin et al.

(10) Patent No.: US 12,105,285 B2
(45) Date of Patent: Oct. 1, 2024

(54) APPARATUS FOR USE IN A NEAR EYE DISPLAY

(71) Applicant: Nokia Technologies Oy, Espoo (FI)

(72) Inventors: Peter Eskolin, Pirkkala (FI); Toni Jarvenpaa, Akaa (FI)

(73) Assignee: Nokia Technologies Oy, Espoo (FI)

( * ) Notice: Subject to any disclaimer, the term of this patent is extended or adjusted under 35 U.S.C. 154(b) by 34 days.

(21) Appl. No.: 16/971,418

(22) PCT Filed: Mar. 7, 2018

(86) PCT No.: PCT/FI2018/050168
§ 371 (c)(1),
(2) Date: Aug. 20, 2020

(87) PCT Pub. No.: WO2019/170954
PCT Pub. Date: Sep. 12, 2019

(65) Prior Publication Data
US 2020/0393681 A1 Dec. 17, 2020

(51) Int. Cl.
*G02B 27/01* (2006.01)
*G02B 27/09* (2006.01)
*H04N 5/33* (2023.01)

(52) U.S. Cl.
CPC ..... *G02B 27/0172* (2013.01); *G02B 27/0944* (2013.01); *G02B 27/0977* (2013.01); *H04N 5/33* (2013.01); *G02B 2027/0178* (2013.01); *G02B 2027/0187* (2013.01)

(58) Field of Classification Search
CPC ............ G02B 27/0172; G02B 27/0944; G02B 27/0977; G02B 27/017; G02B 27/0093; G02B 2027/0178; G02B 2027/0187; G02B 27/0018; G02B 27/0081; G02B 2027/0118; H04N 5/33
See application file for complete search history.

(56) References Cited

U.S. PATENT DOCUMENTS

| | | | |
|---|---|---|---|
| 9,182,596 B2 | 11/2015 | Border et al. | ................. 715/756 |
| 10,109,054 B1 * | 10/2018 | Wilson | ............... G02B 27/0172 |
| 10,152,141 B1 * | 12/2018 | Lohse | ..................... G06F 3/013 |
| 2009/0162015 A1 * | 6/2009 | Meir | ...................... G02B 6/008 |
| | | | 385/49 |
| 2013/0002846 A1 * | 1/2013 | De Bruijn | ............ G06V 40/193 |
| | | | 348/78 |
| 2013/0242392 A1 * | 9/2013 | Amirparviz | .......... G02B 5/3025 |
| | | | 359/485.05 |

(Continued)

FOREIGN PATENT DOCUMENTS

| | | |
|---|---|---|
| EP | 3 133 434 A1 | 2/2017 |
| EP | 3 232 254 A1 | 10/2017 |
| WO | WO 2017/147534 A1 | 8/2017 |

*Primary Examiner* — Ibrahim A Khan
(74) *Attorney, Agent, or Firm* — Harrington & Smith (57) ABSTRACT

The apparatus including an optical arrangement including at least one light guide wherein the at least one light guide is configured to propagate a beam of light from an image source towards a user's eye to direct the beam of light to a location proximate to the user's eye. The apparatus also including absorptive material positioned within the optical arrangement so as to absorb light having a first wavelength from the optical arrangement and re-emit light having a second wavelength where the second wavelength is different to the first wavelength.

15 Claims, 5 Drawing Sheets

(56) References Cited

U.S. PATENT DOCUMENTS

| | | | |
|---|---|---|---|
| 2014/0043320 A1 | 2/2014 | Tosaya et al. | 345/419 |
| 2014/0111865 A1* | 4/2014 | Kobayashi | G02B 5/003 |
| | | | 359/633 |
| 2015/0169953 A1* | 6/2015 | Border | H04N 5/33 |
| | | | 348/78 |
| 2015/0205131 A1* | 7/2015 | Border | G02B 26/0833 |
| | | | 359/630 |
| 2017/0248750 A1* | 8/2017 | Curtis | G02B 6/0068 |
| 2018/0267312 A1* | 9/2018 | Melli | G02B 6/0043 |
| 2018/0293423 A1* | 10/2018 | Huang | H01L 27/14629 |
| 2018/0374266 A1* | 12/2018 | Schowengerdt | G02B 27/0944 |
| 2019/0011704 A1* | 1/2019 | Jarvenpaa | G02B 27/283 |
| 2019/0204624 A1* | 7/2019 | Barrau | G02B 5/28 |

\* cited by examiner

APPARATUS FOR USE IN A NEAR EYE DISPLAY

CROSS REFERENCE TO RELATED APPLICATION

This patent application is a U.S. National Stage application of International Patent Application Number PCT/FI2018/050168 filed Mar. 7, 2018, which is hereby incorporated by reference in its entirety.

TECHNOLOGICAL FIELD

Examples of the disclosure relate to an apparatus for use in a near eye display. The apparatus comprises light guides for conveying a beam of light from an image source towards a user's eye.

BACKGROUND

Near eye display devices may be used in virtual or augmented reality applications or any other suitable applications. Such devices may comprise optical arrangements for guiding light from an image source to the user's eye so that the image is positioned close to the user's eye.

SUMMARY

According to various but not necessarily all, examples of the disclosure there is provided an apparatus comprising: an optical arrangement comprising at least one light guide wherein the at least one light guide is configured to propagate a beam of light from an image source towards a user's eye to direct the beam of light to a location proximate to the user's eye; and absorptive material positioned within the optical arrangement so as to absorb light having a first wavelength from the optical arrangement and re-emit light having a second wavelength where the second wavelength is different to the first wavelength.

The first wavelength may be in a visible range and the second wavelength may be in a range comprising one or more of near infra-red to infra-red range.

The light absorbed by the absorptive material may comprise excess light.

The absorptive material may comprise quantum dots.

The absorptive material may be provided on one or more inner surfaces of the light guide.

The absorptive material may be provided on one or more outer surfaces of the light guide.

The optical arrangement may comprise one or more expanding elements configured to expand a beam of light and the absorptive material may be provided within the one or more expanding elements.

The optical arrangement may be arranged so that the re-emitted light is directed towards a user's eye so that the re-emitted light can be used for monitoring a user's eye. The absorptive material may be arranged in a pattern to facilitate the re-emitted light to be detected for monitoring a user's eye.

The pattern may be provided by having different thicknesses of absorptive material at different positions within the optical arrangement.

Monitoring a user's eye may comprise gaze tracking.

The optical arrangement may comprise a first light guide configured to propagate a beam of light having a first visible wavelength from an image source towards a user's eye to provide a near eye display and the optical arrangement may comprise a second light guide configured to propagate a beam of light having a second visible wavelength from an image source towards a user's eye to provide a near eye display and wherein the optical arrangement comprises absorptive material positioned within the optical arrangement so as to absorb light having the first visible wavelength from the optical arrangement and re-emit light having a non-visible wavelength and wherein the optical arrangement may also comprise absorptive material positioned within the optical arrangement so as to absorb excess light having the second visible wavelength from the optical arrangement and re-emit light having a non-visible wavelength.

The optical arrangement may comprise a plurality of light guides where light of different wavelengths is transmitted through the different light guides and absorptive material configured to absorb light of the different wavelengths is provided within the optical arrangement.

According to various but not necessarily all, examples of the disclosure there is provided an apparatus comprising: means for propagating a beam of light from an image source towards a user's eye wherein the means are configured to direct the beam of light to a location proximate to the user's eye; and means for absorbing light positioned within the optical arrangement so as to absorb light having a first wavelength from the optical arrangement and re-emit light having a second wavelength where the second wavelength is different to the first wavelength.

According to various but not necessarily all, examples of the disclosure there is provided a near eye display comprising an apparatus as claimed in any preceding claim.

The near eye display may comprise at least one image source.

BRIEF DESCRIPTION OF THE DRAWINGS

For a better understanding of various examples that are useful for understanding the detailed description, reference will now be made by way of example only to the accompanying drawings in which.

DETAILED DESCRIPTION

Examples of the disclosure relate to an apparatus 101 for use in devices such as near eye displays 201. The apparatus 101 comprises an optical arrangement 103 which comprises at least one light guide 105. The light guide 105 is configured to propagate a beam of light 111 from an image source 109 towards a user's eye 113 to direct the beam of light to a location proximate to the user's eye 113. In examples of the disclosure the optical arrangement 103 also comprises absorptive material 107 which is positioned within the optical arrangement 103 so as to absorb light 117 from within the optical arrangement 103. The light absorbed by the absorptive material could be excess light. The excess light could be light from the image source 109 which has not been coupled out of the optical arrangement 103, ambient light or any other unwanted light. The absorptive material 107 is selected so that it absorbs light 117 having a first wavelength and re-emits light 119 having a second different wavelength. This prevents the light 117 from leaking out of the near eye display 203, and/or from creating artefacts within the images provided to the user.

Figure 1:
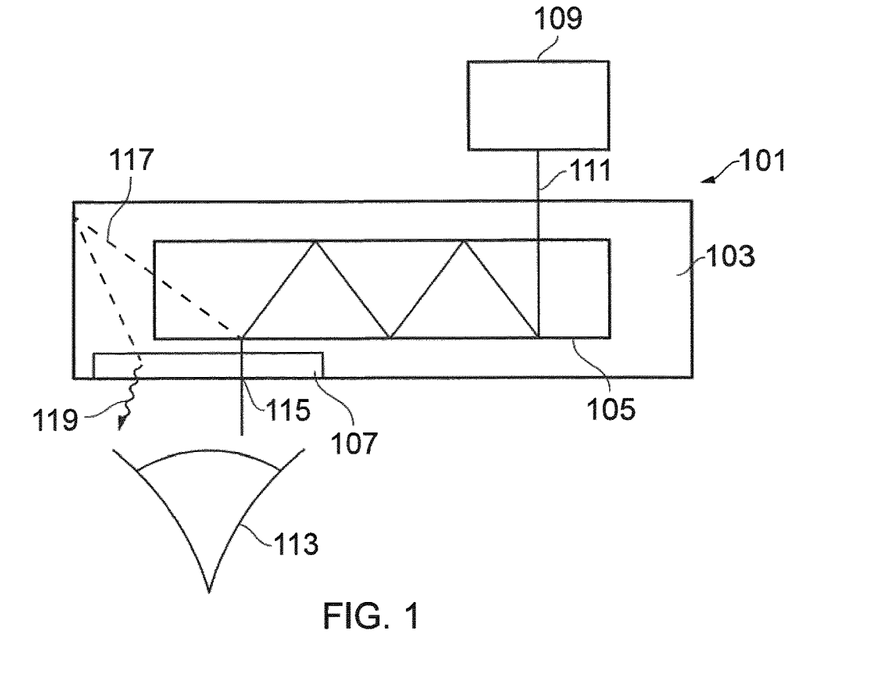
FIG. 1 illustrates an example apparatus.

FIG. 1 schematically illustrates an example apparatus 101. The example apparatus 101 comprises an optical arrangement 103. The optical arrangement 103 comprises a light guide 105 and absorptive material 107. It is to be appreciated that the apparatus 101 and the optical arrangement 103 may comprise additional components that are not shown in FIG. 1.

The optical arrangement 103 may comprise any means for propagating a beam of light 111 from an image source 109 to a position proximate to the user's eye 113. The optical arrangement 103 may be provided within a near eye display 201 or any other suitable type of device. The optical arrangement 103 may be configured so that when the apparatus 101 is in use an exit pupil 115 of the apparatus 101 is positioned proximate to the user's eye 113.

In examples of the disclosure the optical arrangement 103 may comprise at least one light guide 105. The light guide 105 may comprise any means which may be configured to propagate a beam of light 111 from an image source 109 to the exit pupil 115 to enable an image from the image source 109 to be provided proximate to the user's eye 113. In some examples the light guide 105 may propagate a beam of light 111 using total internal reflection.

The light guide 105 may comprise one or more in-coupling elements which are configured to couple a beam of light 111 from the image source 109 into the light guide 105. The light guide 105 may also comprise one or more out-coupling elements which are configured to couple a beam of light 111 out of the light guide 105 and towards the user's eye 113. The in-coupling elements and the out-coupling elements may comprise any suitable optical components such as diffraction gratings, mirrors, semi reflective mirrors, prisms or any other suitable components.

In some examples the optical arrangement 103 may be configured so as to increase the size of the exit pupil that is provided to the user's eye 113. For example the optical arrangement 103 maybe arranged to expand or enlarge an exit pupil of the image source 109. In some such examples the in-coupling elements and/or the out-coupling elements may comprise expanders or other means for increasing the size of the exit pupil. In some examples the light guide 105 may comprise an exit pupil expander.

The absorptive material 107 may comprise any suitable material which may be configured to absorb light at a first wavelength and re-emit light at a second wavelength where the second wavelength is different to the first wavelength. The first wavelength may be in the visible range of the electromagnetic spectrum while the second wavelength might be outside of the visible range of the spectrum. In some examples the second wavelength could be within a range comprising one or more of near infrared and infrared wavelengths. For example the light that is re-emitted by the absorptive material 107 could have a wavelength in the range of 700 to 1200 nanometres. In some examples the light that is re-emitted by the absorptive material 107 could have a wavelength in the range of 780 to 1200 nanometres.

In some examples the absorptive material 107 may comprise quantum dots. The quantum dots comprise nanocrystals in which there is quantum confinement in all three dimensions. The quantum dots may comprise any suitable material. The material that is used for the quantum dots may be chosen dependent upon the wavelengths of light that are to be absorbed and the wavelengths of light that are to be re-emitted and/or any other suitable factors. In some examples the quantum dots may comprise lead sulphide, cadmium sulphide, cadmium selenide, germanium, lead selenide, lead telluride or any other suitable material.

In some examples the size of the quantum dots that are used may be chosen dependent upon the wavelengths of light that are to be absorbed and the wavelengths of light that are to be re-emitted.

In some examples the absorptive material 107 could comprise material other than quantum dots. For example the absorptive material 107 could comprise fluorescent dyed polymers, phosphors or any other suitable material which can absorb light at a first wavelength and re-emit the light at a second wavelength.

In some examples the absorptive material 107 could be provided as film which may be coated onto any suitable portion of the optical arrangement 103. For example the absorptive material 107 could be provided on an inner surface and/or an outer surface of the light guide 105. In other examples the absorptive material 107 could be embedded within the optical arrangement 103. For example, where the absorptive material 107 comprises quantum dots the quantum dots could be provided within the materials that form part of the light guide 105 or other components of the optical arrangement 103.

The absorptive material 107 may be positioned within the optical arrangement 103 so that the absorptive material 107 absorbs light from within the optical arrangement 103. In some examples of the disclosure the absorptive material could be configured to absorb excess light 117. The excess light 117 may be any light that could cause artefacts or unwanted effects in the images viewed by a user and/or which may leak out of a near eye display 203 or other similar device. The excess light 117 could comprise light from the image source 109 that has been internally reflected within the light guide 105 so as to create artefacts within the images. In some examples the excess light 117 could be ambient light from the surroundings of the user that could create artefacts in the images viewed by the user or which could wash out the images viewed by the user which may reduce the image quality. In some examples where the excess light 117 is ambient light this could make eye monitoring more difficult.

FIGS. 2 to 4 and 6 to 9B show example configurations for the absorptive material 107 within the optical arrangement 103. It is to be appreciated that other configurations could be used in other examples of the disclosure.

When the apparatus 101 is in use the apparatus 101 may be positioned proximate to an image source 109. The image source 109 may comprise any means for providing an image. In some examples the image source 109 comprises one or more light sources. The one or more light sources could comprise one or more light emitting diodes or any suitable light sources. The image source 109 could be configured to provide light of a single wavelength or a range of different wavelengths.

In some examples the image source 109 may comprise one or more displays. The displays could be liquid crystal on silicon displays or any other suitable type of displays. The displays may be controlled by controlling circuitry. The controlling circuitry may enable different images to be displayed on the display. This may enable different images to be provided proximate to the user's eye 113.

When the apparatus 101 is in use light 111 from the image source 109 is coupled into the light guide 105. The in-coupled light is 111 is then conveyed through the light guide 105 towards an out-coupling element where it is out-coupled to provide an image proximate to the user's eye 113. However, not all light 111 that is coupled into the light guide 105 might be coupled out. Some excess light 117 may remain in the light guide 105 where there could be further reflections which could lead to artefacts in the image viewed by the user. In examples of the disclosure the absorptive material 107 is configured to absorb this excess light 117 so that it does not cause any artefacts in the image or leak out of a side of the apparatus 101. In some examples the absorptive material 107 re-emits light 119 in an invisible range of the spectrum, such as the infrared or near infrared range. As this re-emitted light 119 is not visible to the user it will not affect the images provided to the user.

In some examples the re-emitted light 119 may be used for eye monitoring. For example infrared light could be used for gaze tracking, for monitoring the shape or other health conditions of the user's eye 113, or for aligning the exit pupil 115 of the optical arrangement 103 with the user's eye 113 or for any other suitable purpose. As the infrared light can be provided by the absorptive material 107 this may avoid the need for additional infrared light emitting diodes or other light sources. FIGS. 6 to 9B show example apparatus 101 where the re-mitted light 119 can be used for gaze tracking.

Figure 2:
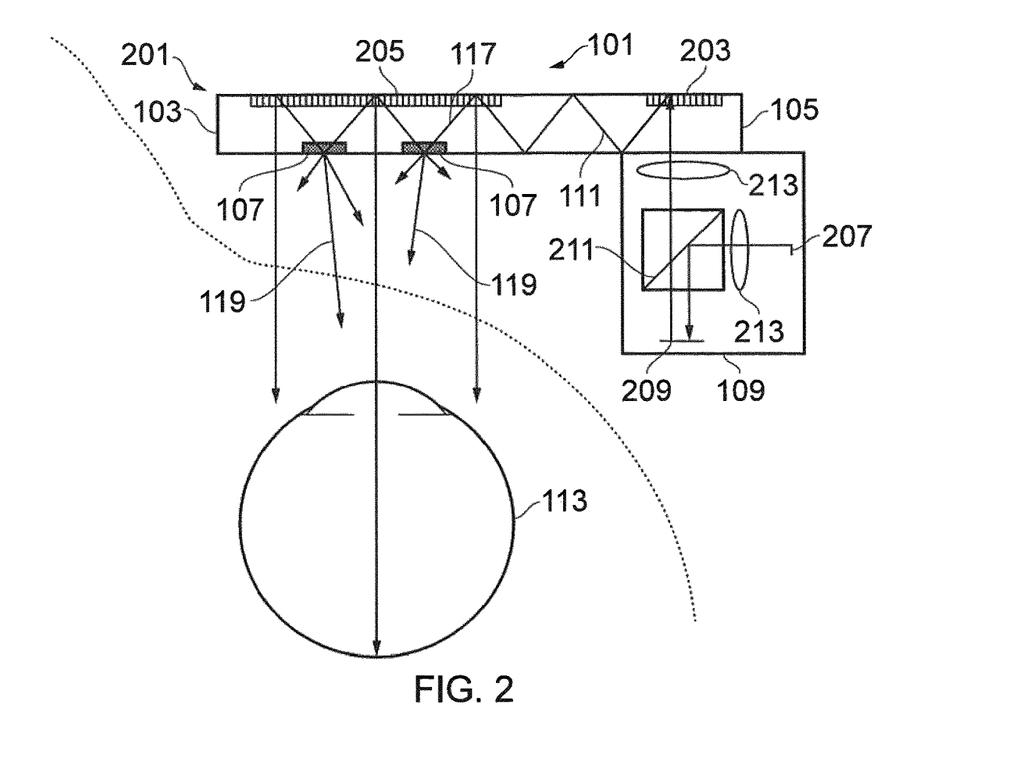
FIG. 2 illustrates a near eye display comprising an example apparatus.

FIG. 2 schematically illustrates a near eye display 201 comprising an example apparatus 101. The example apparatus 101 comprises an optical arrangement 103 comprising a light guide 105 and absorptive material 107 which may be as described in relation to FIG. 1. Corresponding reference numerals are used for corresponding features. In the example of FIG. 2 the near eye display 201 also comprises an image source 109.

In the example of FIG. 2 the image source 109 comprises a light emitting diode 207. The light emitting diode 207 may be configured to emit light of a single wavelength or of a small band of wavelengths. The light emitting diode 207 may emit light in the visible range of the electromagnetic spectrum. In the example of FIG. 2 the light emitting diode 207 could be configured to emit blue light.

Other light emitting diodes 207 configured to emit light at different wavelengths could be used in other examples of the disclosure. For example, only one light guide 105 is shown in the example of FIG. 2. However the near eye display 201 could comprise a plurality of light guides 105 where different light guides 105 could be coupled to different coloured light emitting diodes 207 and configured to propagate the different wavelengths of light toward the user's eye 113.

The image source 109 also comprises a display 209. The display 209 could be a liquid crystal on silicon display or any other suitable type of display. The display 209 could be configured to be illuminated by the light emitting diode 207 so that images displayed on the display 209 can be directed into the optical arrangement 103.

The image source 109 also comprises one or more optical elements which are arranged to direct light from the display 209 into the optical arrangement 103. In the example of FIG. 2 the one or more optical elements comprises a partial beam splitter 211. Other optical components could be used in other examples of the disclosure. The image source 109 also comprises one or more lenses 213 or other suitable means for focusing and/or collimating the light as required.

In the example near eye display 201 shown in FIG. 2 the image source 109 is coupled to the apparatus 101 so that light 111 from the image source 109 is incident on an in-coupling element 203 of the light guide 105. The in-coupling element 203 may comprise any means which may be configured to couple the incident beam of light 111 into the light guide 105. In the example of FIG. 2 the light guide 105 is an exit pupil expander and the in-coupling element 203 is a diffraction grating. Other types of light guide 105 and in-coupling elements 203 may be used in other examples of the disclosure.

Once the light 111 is in-coupled to the light guide 105 it is propagated along the light guide 105 to the out-coupling element 205. The light 111 may be propagated along the light guide 105 via total internal reflection.

The out-coupling element 205 may comprise any means which may be configured to couple the beam of light 111 out of the light guide 105. In the example of FIG. 2 the light guide 105 is an exit pupil expander and the out-coupling element 205 is a diffraction grating. The diffraction grating which provides the out-coupling element 205 covers a larger area than the diffraction grating which provides the in-coupling element 203 so as to laterally expand the exit pupil provided by the image source 109. Other types of light guide 105 and out-coupling elements 205 may be used in other examples of the disclosure.

In some examples the efficiency of the diffraction gratings on the out-coupling element 205 may be modulated to increase the out-coupling efficiency toward the outer edge of the out-coupling element 205. For example, the depth of the diffraction gratings can be increased toward the outer edge of the out-coupling element 205. The out-coupling element 205 is not completely efficient and so some excess light 117 will not be out-coupled from the light guide 105 and could be reflected back into the light guide 105 from the edge of the light guide 105. This excess light 117 may cause artifacts, or other unwanted effects, in the images viewed by the user. In some examples the excess light 117 could create a leakage of light at an edge of the near eye display 201. In the example of FIG. 2 two portions of absorptive material 107 are provided within the optical arrangement 103 to absorb the excess light 117. Other numbers of portions of absorptive material 107 could be provided in other examples of the disclosure.

The absorptive material 107 is positioned within the optical arrangement 103 so that the excess light 117 is incident on the absorptive material 107. In the example of FIG. 2 the portions of the absorptive material 107 are provided on a surface of the light guide 105. The surface could be an inner surface and/or an outer surface. In other examples the absorptive material 107 could be embedded within the light guide 105.

In the example of FIG. 2 the portions of absorptive material 107 are provided on an opposite surface of the light guide 105 to the out-coupling element 205. In the example of FIG. 2 the portions of absorptive material 107 are provided on an opposite surface to the out-coupling element 205 with the out-coupling element 205. It is to be appreciated that the absorptive material 107 could be provided in other locations within the optical arrangement 103 in other examples of the disclosure.

When the excess light 117, or any other light, is incident on the absorptive material 107 the absorptive material 107 absorbs the incident excess light 117 or any other light. The absorptive material 107 will then re-emit the light 119 at a different wavelength. The re-emitted wavelength may be infrared or near infrared so that the re-emitted light 119 is not visible to the user.

In the example of FIG. 2 some of the re-emitted light 119 is directed towards the user's eye 113. This may enable the re-emitted light 119 to be used to illuminate the user's eye 113. For example, the infrared illumination could be used for gaze tracking or for other eye monitoring purposes.

In the example of FIG. 2 the light that is absorbed by the absorptive material 107 need not be excess light 117. For example it may comprise light from the image source 109. In such examples this may result in a reduction of the brightness of the image that is viewed by the user. Whether the absorptive material 107 absorbs excess light, light from image source or a combination of different types of light may be determined by the position of the absorptive material 107 within the optical arrangement 103.

Figure 3:
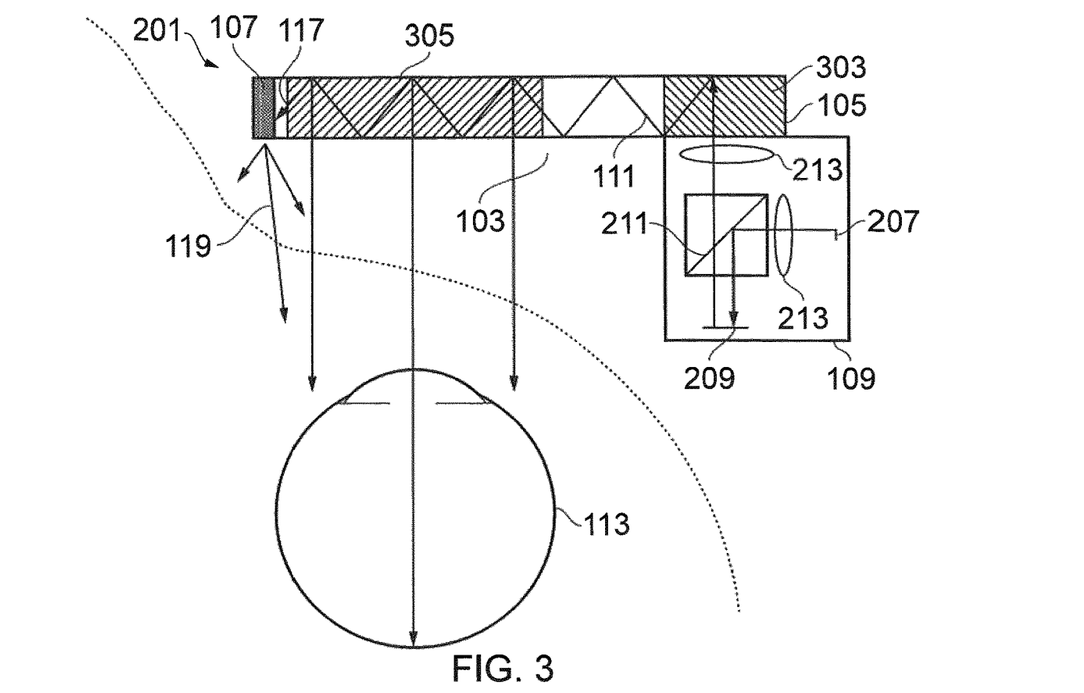
FIG. 3 illustrates another near eye display comprising an example apparatus.

FIG. 3 schematically illustrates another near eye display 201 comprising another example apparatus 101. The example apparatus 101 comprises an optical arrangement 103 comprising a light guide 105 and absorptive material 107. In the example of FIG. 3 the near eye display 201 also comprises an image source 109.

In the example of FIG. 3 the image source 109 comprises a light emitting diode 207 and a display 209 which may be as described in relation to FIG. 2. Corresponding reference numerals are used for corresponding features. Other types of image sources 109 could be used in other examples of the disclosure.

In the example near eye display 201 shown in FIG. 3 the image a source 109 is coupled to the apparatus 101 so that light 111 from the image source 109 is incident on an in-coupling element 303 of the light guide 105. In the example of FIG. 3 the in-coupling element 303 comprises a plurality of reflective or semi-reflective mirrors. In some examples the in-coupling element 303 may comprise one reflective mirror. Other numbers of reflective or semi-reflective mirrors could be used in other examples of the disclosure.

Once the light 111 is in-coupled to the light guide 105 it is propagated along the light guide 105 to the out-coupling element 305. The light 111 may be propagated along the light guide 105 via total internal reflection.

The out-coupling element 305 may comprise any means which may be configured to couple the beam of light 111 out of the light guide 105. In the example of FIG. 3 the out-coupling element 305 comprises a plurality of semi-reflective mirrors. In some examples the out-coupling element 305 may comprise four semi-reflective mirrors. Other numbers of semi-reflective mirrors could be used in other examples of the disclosure. The out-coupling element 305 covers a larger area and may comprise a greater number of mirrors, or semi-reflective mirrors than the in-coupling element 303 so as to expand the exit pupil provided by the beam of light 111 from the image source 109.

As with the previously described examples the out-coupling element 305 is not completely efficient and so some excess light 117 will not be out-coupled from the light guide 105 but will be reflected back inside the light guide 105. In order to avoid light leakage or other unwanted effects absorptive material 107 is provided within the optical arrangement 103.

In the example of FIG. 3 a single portion of absorptive material 107 is provided within the optical arrangement 103 to absorb the excess light 117. The absorptive material 107 is provided at an end of the light guide 105. The absorptive material 107 is provided at an opposite end of the light guide 105 to the image source 109. The absorptive material 107 is provided at an end of the light guide 105 closest to the out-coupling element 305. In some examples the absorptive material 107 may completely cover the end of the light guide 105. In other examples the absorptive material 107 may partially cover the end of the light guide 105. This may reduce light leakage from the near eye display 201.

When the excess light 117 is incident on the absorptive material 107 the absorptive material 107 absorbs the incident excess light 117. The absorptive material 107 will then re-emit the light 119 at a different wavelength. The re-emitted wavelength may be infrared or near infrared so that it is not visible to the user. In the example of shown in FIG. 3 the re-emitted light 119 may be re-emitted so that it is not incident on the user's eye 113.

Figure 4:
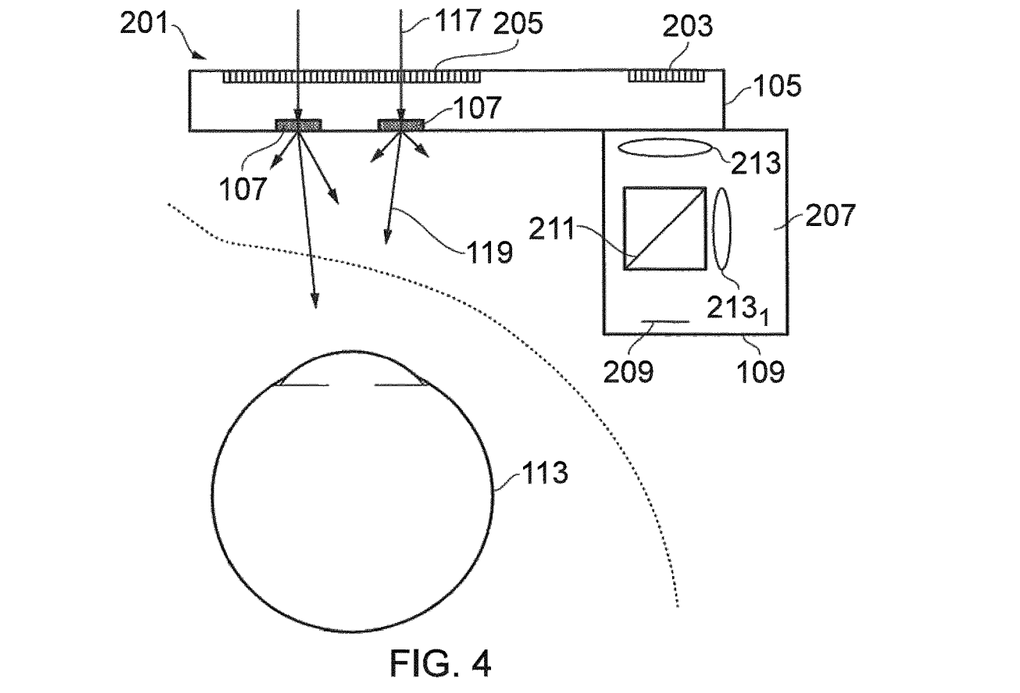
FIG. 4 illustrates another near eye display comprising an example apparatus.

FIG. 4 schematically illustrates another near eye display 201 comprising an example apparatus 101. In the example of FIG. 4 the excess light 117 comprises ambient light rather than light originating from the light source 109. The example apparatus 101 and near eye display 201 shown in FIG. 4 may be the same as those shown in FIG. 2 and described above. Corresponding reference numerals are used for corresponding features. It is to be appreciated that the near eye display 201 shown in FIG. 3 or near eye displays 201 according to any other example could also be used.

The beam of light 111 from the image source 109 is not shown in FIG. 4 for clarity.

In the example of FIG. 4 near eye display 201 is being used in an environment where there is bright ambient illumination. This ambient light could leak into the optical arrangement 103 and cause artifact in the images. The bright ambient light could also make any infrared illumination of the user's eye 113 harder to detect for gaze tracking or other eye monitoring purposes.

In the example of FIG. 4 the absorptive material 107 absorbs the excess light 117 that originates from the ambient light. The absorptive material 107 will then re-emit the light 119 at a different wavelength. The re-emitted wavelength may be infrared or near infrared so that it is not visible to the user. The type of absorptive material 107 that is used in the example of FIG. 4 may be chosen so that it effectively absorbs wavelengths within the range of the ambient light. This could be light within the visible spectrum, or in the ultraviolet range of the spectrum or any other suitable wavelength.

In the example of FIG. 4 some of the re-emitted light 119 is directed towards the user's eye 113. This may enable the re-emitted light 119 to be used to illuminate the user's eye 113. For example, the infrared illumination could be used for gaze tracking or for other eye monitoring purposes.

Absorbing the excess light 117 that originates from the ambient light may make the infrared light used for eye monitoring easier to detect. The excess light 117 originating from the ambient light may increase the amount of infrared light provided by the absorptive material 107. This may increase the intensity of the infrared light that is used to illuminate the user's eye 113. In some examples this may also decrease the brightness of the ambient illumination that is incident on the user's eye 113. This therefore may provide for improved eye monitoring.

Figure 5A:
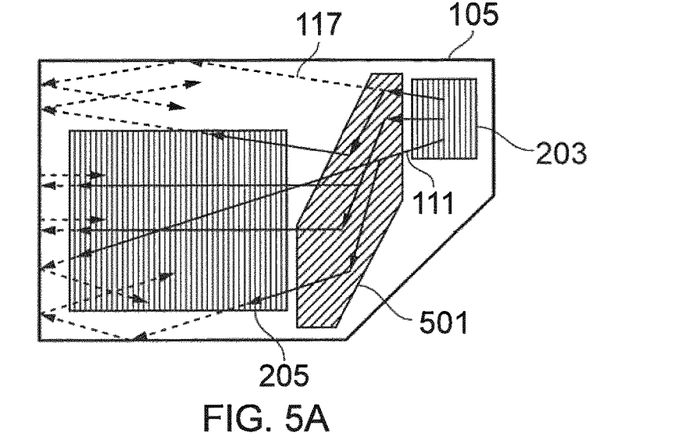
FIGS. 5A to 5C illustrate example light guides that may be used in examples of the disclosure.
Figure 5B:
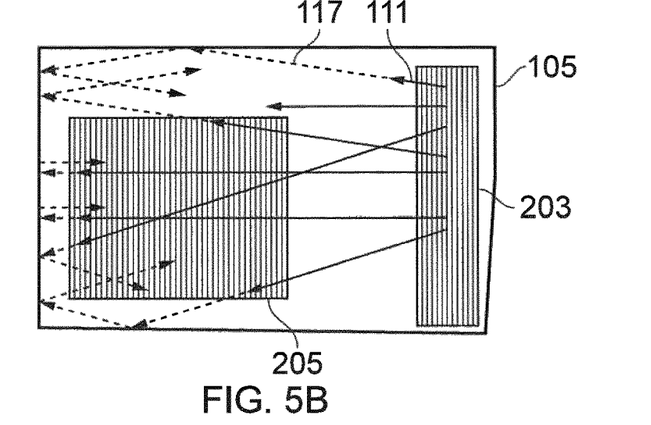
Figure 5C:
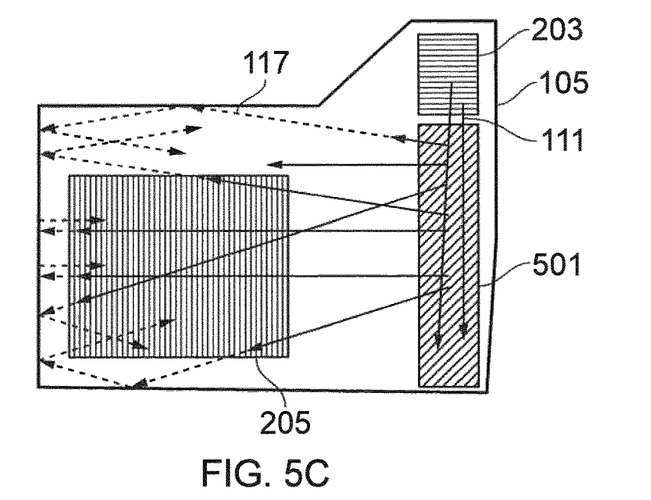

FIGS. 5A to 5C illustrate example light guides 105 that may be used in apparatus 101 in examples of the disclosure. In the examples of FIGS. 5A to 5C the light guides 105 comprise exit pupil expanders where the in-coupling elements 203 and the out-coupling elements 205 and any intermediate expanding elements comprise diffraction gratings. It is to be appreciated that other types of light guides 105 with other types of in-coupling elements and/or out-coupling elements and/or intermediate elements could be used in other examples of the disclosure.

In the example of FIG. 5A the light guide 105 comprises an in-coupling element 203, an out-coupling element 205 and an intermediate expanding element 501. In the example of FIG. 5A the intermediate expanding element 501 may comprise a vertical expander.

The intermediate expanding element 501 is positioned within the light guide 105 between the in-coupling element 203 and the out-coupling element 205. The intermediate expanding element 501 is positioned between the in-coupling element 203 and the out-coupling element 205 so that light 111 that is coupled into the light guide 105 via the in-coupling element 203 is propagated through the intermediate expanding element 501 before it is incident on the out-coupling element 205.

As shown by the arrows in FIG. 5A not all of the light that propagates through the intermediate expanding element 501 is then conveyed to the out-coupling element 205. Some of the light 111 is instead, incident on the sides of the light guide 105 which then causes the light to be reflected back into the light guide 105. Similarly not all of the light that is incident on the out-coupling element 205 is coupled out of the light guide 105. Some of this light 111 is also reflected back into the light guide 105. This creates unwanted artifacts in the images provided to the user.

In the example of FIG. 5B the light guide 105 comprises an in-coupling element 203, an out-coupling element 205 and no intermediate expanding element 501. However, as shown by the arrows in FIG. 5B not all of the light that is incident on the out-coupling element 205 is coupled out of the light guide 105. The light 117 that is reflected back into the light guide 105 creates unwanted artifacts in the images provided to the user.

In the example of FIG. 5C the light guide 105 comprises an in-coupling element 203, an out-coupling element 205 and an intermediate expanding element 501. In the example of FIG. 5C the intermediate expanding element 501 may comprise a vertical expander.

The intermediate expanding element 501 is positioned within the light guide 105 between the in-coupling element 203 and the out-coupling element 205. The intermediate expanding element 501 is positioned between the in-coupling element 203 and the out-coupling element 205 so that light 111 that is coupled into the light guide via the in-coupling element 203 is conveyed through the intermediate expanding element 501 before it is incident on the out-coupling element 205.

As shown by the arrows in FIG. 5C not all of the light that is incident on the intermediate expanding element 501 and the out-coupling element 205 is coupled out of the light guide 105. The light that is reflected back into the light guide 105 creates unwanted artifacts in the images provided to the user.

FIG. 5A to 5C show the problems that the excess light 117 within the light guide 105 can create. The examples of the disclosure can reduce the unwanted artifacts through the use of the absorptive material 107. FIGS. 6 to 9B show example configurations for the absorptive material 107.

Figure 6:
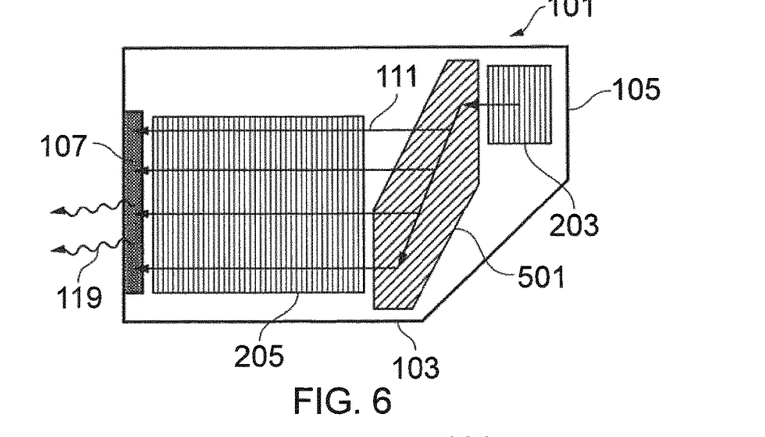
FIG. 6 illustrates another example apparatus.

FIG. 6 illustrates an example apparatus 101 which could be used in examples of the disclosure. The apparatus 101 could be provided within a near eye display 201 or any other suitable type of device. The example apparatus 101 comprises an optical arrangement 103 comprising a light guide 105 and absorptive material 103. In the example of FIG. 6 the light guide 105 is an exit pupil expander comprising an in-coupling element 203, an out-coupling element 205 and an intermediate expanding element 501. The configuration of the in-coupling element 203, out-coupling element 205 and intermediate expanding element 501 may be the same as the example shown in FIG. 5A. It is to be appreciated that other configurations of the in-coupling element 203, the out-coupling element 205 and the intermediate expanding element 501 could be used in other examples of the disclosure.

In the example of FIG. 6 the apparatus 101 comprises absorptive material 107 provided on an end of the light guide 105. The absorptive material 107 may cover, or at least partially cover the end of the light guide 105. This acts to absorb the light incident on the absorptive material 107 and prevent this excess light from being reflected back into the light guide.

The absorptive material 107 is configured to re-emit light 119 of a different wavelength. The re-emitted light 119 could be infrared or near infrared light. The re-emitted light could be directed towards the user's eye 113 any used for eye monitoring purposes. FIGS. 7A to 9B show examples where the re-emitted light 119 is used for gaze tracking.

Figure 7A:
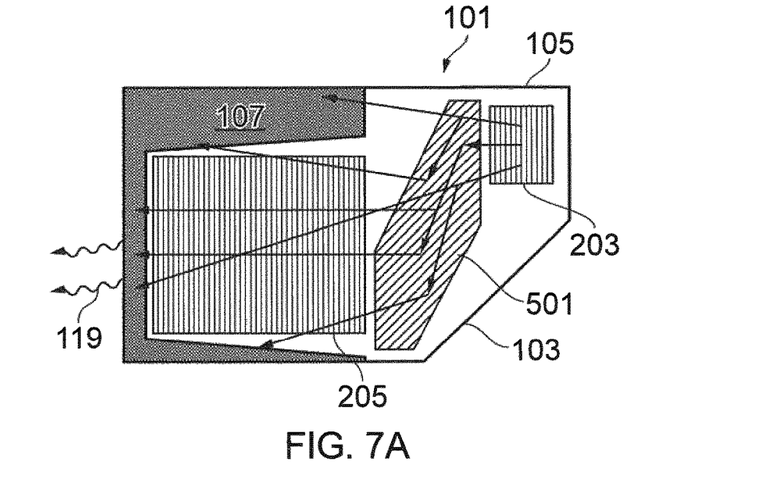
FIGS. 7A to 7B illustrate another example apparatus.
Figure 7B:
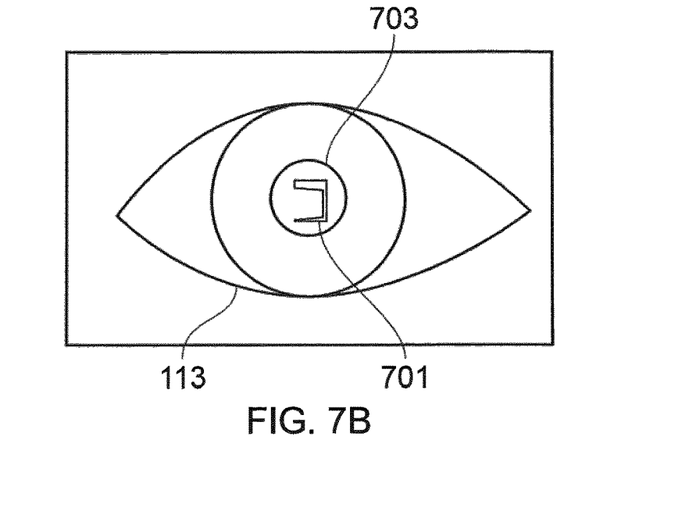

FIG. 7A shows another example apparatus 101 and FIG. 7B schematically shows a pattern 701 that may be projected onto the user's eye 113 by the re-emitted light 119.

In the example of FIG. 7A the light guide 105 comprises an in-coupling element 203, out-coupling element 205 and intermediate expanding element 501 which are configured as shown in the example of FIG. 5A. It is to be appreciated that other configurations of the light guide 105 and the respective in-coupling elements 203, out-coupling elements 205 and intermediate expanding elements 501 could be used in other examples of the disclosure.

In the example of FIG. 7A the apparatus 101 comprises absorptive material 107 provided within the light guide 105. The absorptive material 107 may be arranged in a pattern to facilitate the re-emitted light 119 to be detected for monitoring a user's eye 113. For example the pattern created by the re-emitted light 119 may have features which can be easily detected and/or monitored by an eye monitoring device.

The pattern could be created in any suitable way. In some examples the pattern could be created by the shape of the absorptive material 107 as it is provided within the optical arrangement 103. In some examples the pattern could be provided by having different thicknesses of absorptive material 107 at different positions within the optical arrangement 103. In some examples the pattern could be provided by having different densities of absorptive material 107 at different positions within the optical arrangement 103. In some examples the pattern could be provided by having different types of absorptive material 107 at different positions within the optical arrangement 103.

In the example apparatus 101 of FIG. 7A the absorptive material 107 may cover, or at least partially cover the end of the light guide 105 and some of the sides of the light guide. The pattern of the absorptive material 107 in FIG. 7A forms a U-shaped, or substantially U-shaped, formation. In the example of FIG. 7A the absorptive material 107 may be provided on the surface of the light guide 105 so as to cover as much of the surface area of the light guide 105 as possible. Therefore the pattern of the absorptive material 107 may be determined by the configuration of light guide 105.

The U-shaped formation of the absorptive material 107 generates a U-shaped pattern 701 in the re-mitted light 119. The reflection of the re-emitted light can then be detected from the user's eye 113. This is shown in FIG. 7B where the U-shaped pattern 701 is detected on the cornea 703 of the eye 113. An eye monitoring device may be configured to detect the U-shaped pattern and use this for gaze tracking or other eye monitoring purposes.

Figure 8A:
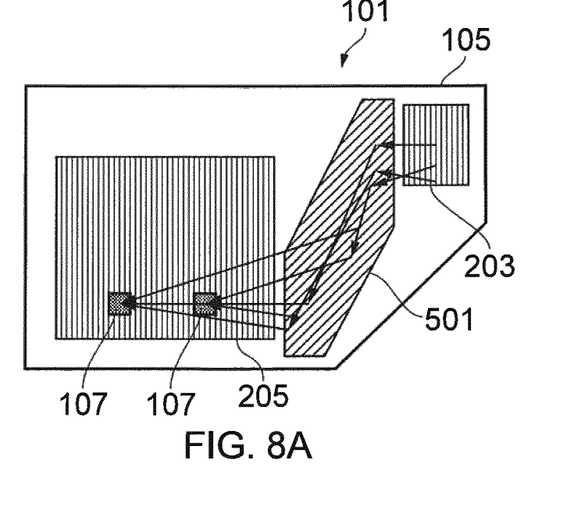
FIGS. 8A to 8B illustrate another example apparatus.
Figure 8B:
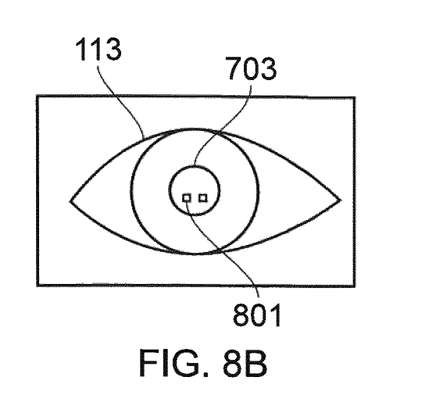

FIG. 8A shows another example apparatus 101 and FIG. 8B schematically shows a pattern 801 that may be projected onto the user's eye 113 by the re-emitted light 119.

In the example of FIG. 8A the light guide 105 comprises an in-coupling element 203, out-coupling element 205 and intermediate expanding element 501 which are configured as shown in the example of FIG. 5A. It is to be appreciated that other configurations of the light guide 105 and the respective in-coupling elements 203, out-coupling elements 205 and intermediate expanding elements 501 could be used in other examples of the disclosure.

In the example of FIG. 8A the apparatus 101 comprises absorptive material 107 provided within the light guide 105. In the example of FIG. 8A the absorptive material 107 is provided within one or more expanding elements 501, 205 of the light guide 105. In the particular example of FIG. 8A the absorptive material 107 is provided within the out-coupling element 205. In other examples the absorptive material 107 could be provided within the intermediate expanding elements 501 or any other suitable component of the light guide 105 or optical arrangement 103.

In the example of FIG. 8A the absorptive material 107 is provided as two square portions within the out-coupling element 205. This creates a pattern 801, in the re-emitted light where the pattern 801 comprises two squares. FIG. 8B shows the reflection of the pattern 801 from the cornea 703 of the user's eye 113.

An eye monitoring device may be configured to detect the pattern 801 comprises two squares and use this for gaze tracking or other eye monitoring purposes.

Figure 9A:
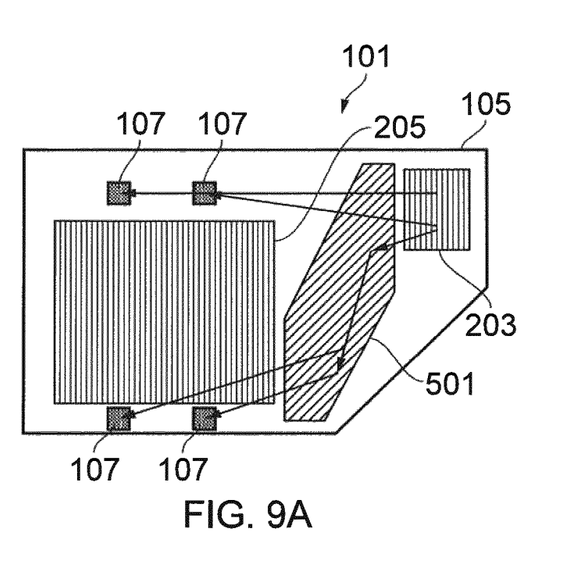
FIGS. 9A to 9B illustrate another example apparatus.
Figure 9B:
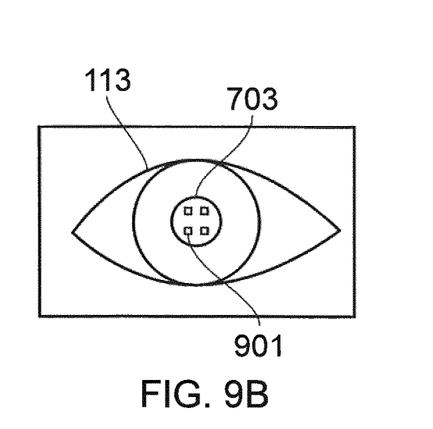

FIG. 9A shows another example apparatus 101 and FIG. 9B schematically shows a pattern 801 that may be reflected from the user's eye 113 from the re-emitted light 119.

In the example of FIG. 9A the light guide 105 comprises an in-coupling element 203, out-coupling element 205 and intermediate expanding element 501 which are configured as shown in the example of FIG. 5A. It is to be appreciated that other configurations of the light guide 105 and the respective in-coupling elements 203, out-coupling elements 205 and intermediate expanding elements 501 could be used in other examples of the disclosure.

In the example of FIG. 9A the apparatus 101 comprises four portions of absorptive material 107 provided within the light guide 105. In the example of FIG. 9A the absorptive material 107 is provided within the light guides 105 in a two by two array. In the example of FIG. 9A the four portions of absorptive material 107 are provided adjacent to the out-coupling element 205. The portions of absorptive material 107 could be provided in different positions in other examples of the disclosure.

The arrangement of the four portions of absorptive material 107 creates a pattern 901, in the re-emitted light where the pattern 901 comprises four squares arranged in a two by two array. The two by two array may form a square. FIG. 9B shows the pattern 901 projected onto the cornea 703 of the user's eye 113. Other arrays or patterns could be used in other examples of the disclosure.

An eye monitoring device may be configured to detect the 901 comprises two squares and use this for gaze tracking or other eye monitoring purposes.

In the examples shown above, only a single light guide 105 is shown in each of the optical arrangements 103. It is to be appreciated that in some examples the optical arrangements 103 could comprise a plurality of light guides 105. For instance, the optical arrangement 103 could comprise a plurality of light guides 105 where each light guide 105 is configured to convey a different wavelength of light to the user's eye 113. The light that is conveyed to the user's eye 113 may be in the visible range of the spectrum. For example a first light guide 105 could be configured to convey red light to the user's eye 113, a second light guide 105 could be configured to convey blue light to the user's eye 113 and a third light guide 105 could be configured to convey green light to the user's eye 113. In such examples the light guides 105 could be provided in a stacked configuration or in any other suitable configuration.

In such examples the optical arrangement 103 could comprise absorptive material 107 which could be arranged to absorb the different wavelengths of light from the different light guides 105. In some examples a plurality of different types of absorptive material 107 may be provided within the optical arrangement 103 so that the different types of absorptive material 107 can absorb different wavelengths of light. In some examples the different types of absorptive material 107 will re-emit light having the same wavelength while in other examples the different types of absorptive material 107 will re-emit light having different wavelengths. Where the different types of absorptive material 107 re-emits light having different wavelengths, the different wavelengths could be within the same range of the electromagnetic spectrum. For example, the different wavelengths could be within the infrared and/or near infrared portion of the electromagnetic spectrum.

In the above described examples the in-coupling elements 203, 303 and the out-coupling elements 205, 305 comprise diffraction gratings, mirrors or semi reflective mirrors. It is to be appreciated that other types of in-coupling elements, 203, 303 and/or out-coupling elements 203, 305 could be used in other examples of the disclosure. For example the respective elements could comprise prisms, polarizing beam splitters or any other suitable optical elements and/or combinations of optical elements.

Examples of the disclosure provide the advantage that excess light can be absorbed from the optical arrangement and artifacts, light leakage and other unwanted effects are reduced. This provides for improved quality of images in a near eye display 201 and reduces the wasted light.

Also in some examples the unwanted excess light 117 is converted into infrared light which can be used for gaze tracking and/or other eye monitoring purposes. This provides for an efficient apparatus 101 as the energy of the excess light 117 is converted into a useful source of infrared light.

Furthermore it may provide for improved gaze tracking device, or other type of eye monitoring device. As the infrared light is generated from the excess light rather than a dedicated infrared light source this removes the need to have an infrared light source which would usually be positioned in front of the user's eye 113. This means that there is no infrared light source and/or electrical wires and connections for the infrared light source in the user's line of sight which would be visible in the near eye display 201.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
an optical arrangement comprising at least one light guide wherein the at least one light guide is configured to propagate a beam of light from an image source towards a user's eye to direct the beam of light to a location proximate to the user's eye; and
absorptive material embedded into a material of the optical arrangement in two or more discrete portions and positioned within the optical arrangement so as to absorb light having a first wavelength from within optical arrangement from an out-coupler, wherein the beam of light propagated towards the user's eye does not pass through the absorptive material, and wherein the absorptive material changes the first wavelength to re-emit light having a second wavelength where the second wavelength is different to the first wavelength.

2. An apparatus as claimed in claim 1 wherein the first wavelength is in a visible range and the second wavelength is in a range comprising one or more of near infra-red to infrared range.

3. An apparatus as claimed in claim 1 wherein the light absorbed by the absorptive material comprises excess light.

4. An apparatus as claimed in claim 1 wherein the absorptive material comprises quantum dots.

5. An apparatus as claimed in claim 1 wherein the absorptive material is provided on one or more inner surfaces of the light guide.

6. An apparatus as claimed in claim 1 wherein the absorptive material is provided on one or more outer surfaces of the light guide.

7. An apparatus as claimed in claim 1 wherein the optical arrangement comprises one or more expanding elements configured to expand a beam of light and the absorptive material is provided within the one or more expanding elements.

8. An apparatus as claimed in claim 1 wherein the optical arrangement is arranged so that the re-emitted light is directed towards a user's eye so that the re-emitted light can be used for monitoring a user's eye.

9. An apparatus as claimed in claim 8 wherein the absorptive material is arranged in a pattern to facilitate the re-emitted light to be detected for monitoring a user's eye.

10. An apparatus as claimed in claim 9 wherein the pattern is provided by having different thicknesses of absorptive material at different positions within the optical arrangement.

11. An apparatus as claimed in claim 8 wherein monitoring a user's eye comprises gaze tracking.

12. An apparatus as claimed in claim 1 wherein the optical arrangement comprises a first light guide configured to propagate a beam of light having a first visible wavelength from an image source towards a user's eye to provide a near eye display and the optical arrangement comprises a second light guide configured to propagate a beam of light having a second visible wavelength from an image source towards a user's eye to provide a near eye display and wherein the optical arrangement comprises absorptive material positioned within the optical arrangement so as to absorb light having the first visible wavelength from the optical arrangement and re-emit light having a non-visible wavelength and wherein the optical arrangement also comprises absorptive material positioned within the optical arrangement so as to absorb excess light having the second visible wavelength from the optical arrangement and re-emit light having a non-visible wavelength.

13. An apparatus as claimed in claim 1 wherein the optical arrangement comprises a plurality of light guides where light of different wavelengths is transmitted through the different light guides and absorptive material configured to absorb light of the different wavelengths is provided within the optical arrangement.

14. A near eye display comprising an apparatus as claimed in claim 1.

15. A near eye display as claimed in claim 14 comprising at least one image source.

* * * * *